(12) United States Patent
Ikari et al.

(10) Patent No.: US 11,866,346 B2
(45) Date of Patent: Jan. 9, 2024

(54) COMPOSITE OXIDE POWDER

(71) Applicant: DOWA ELECTRONICS MATERIALS CO., LTD., Tokyo (JP)

(72) Inventors: Kazumasa Ikari, Okayama (JP); Shintaro Ogawa, Okayama (JP); Toshihiko Ueyama, Tokyo (JP)

(73) Assignee: DOWA ELECTRONICS MATERIALS CO., LTD., Tokyo (JP)

( * ) Notice: Subject to any disclaimer, the term of this patent is extended or adjusted under 35 U.S.C. 154(b) by 0 days.

(21) Appl. No.: 17/925,724

(22) PCT Filed: Aug. 7, 2020

(86) PCT No.: PCT/JP2020/030323
§ 371 (c)(1),
(2) Date: Nov. 16, 2022

(87) PCT Pub. No.: WO2022/029992
PCT Pub. Date: Feb. 10, 2022

(65) Prior Publication Data
US 2023/0197972 A1  Jun. 22, 2023

(51) Int. Cl.
*C01G 5/00* (2006.01)
*C01G 51/00* (2006.01)
(Continued)

(52) U.S. Cl.
CPC ........ *C01G 51/006* (2013.01); *H01M 4/9033* (2013.01); *C01P 2002/34* (2013.01);
(Continued)

(58) Field of Classification Search
CPC ....... H01M 2008/1293; H01M 4/9033; H01M 4/86; C01P 2002/34; C01P 2004/61;
(Continued)

(56) References Cited

U.S. PATENT DOCUMENTS

2010/0159333 A1* 6/2010 Sugiura ............... H01M 10/052
429/231.95
2015/0162621 A1   6/2015 Nada et al.

FOREIGN PATENT DOCUMENTS

JP  S63-100001 A   5/1988
JP  H04-193701 A   7/1992
(Continued)

OTHER PUBLICATIONS

JP2020113424 A(machine translation), Honda et al.*
(Continued)

*Primary Examiner* — Smita S Patel
(74) *Attorney, Agent, or Firm* — Oliff PLC

(57) ABSTRACT

A composite oxide powder including a composition formula (1), wherein the ratio $\alpha/\beta$ of a surface area value $\alpha$ (m$^2$/g) calculated by a BET one-point method to a surface area value $\beta$ (m$^2$/g) calculated from a formula (2) is greater than 1.0 and equal to or less than 1.5 and the surface area value $\alpha$ is equal to or less than 20 m$^2$/g. ABO$_{3-\delta}$ (1) (wherein A is one or more types of elements (La, Sr, Sm, Ca and Ba), B is one or more types of elements (Fe, Co, Ni and Mn) and $0 \leq \delta < 1$); and surface area value $\beta$ (m$^2$/g)=specific surface area value $\gamma$-surface area value $\varepsilon$(2) (the specific surface area value $\gamma$ (m$^2$/g) is a value in a total pore size range measured by a mercury intrusion method. The specific surface area value $\varepsilon$ (m$^2$/g) is a value in a range of pore sizes that are larger than a 50% cumulative particle size.

11 Claims, 2 Drawing Sheets

(51) Int. Cl.
*H01M 4/90* (2006.01)
*H01M 8/12* (2016.01)

(52) U.S. Cl.
CPC ...... *C01P 2004/61* (2013.01); *C01P 2006/12* (2013.01); *C01P 2006/14* (2013.01); *C01P 2006/40* (2013.01); *H01M 2008/1293* (2013.01)

(58) Field of Classification Search
CPC .............. C01P 2004/62; C01P 2004/51; C01P 2006/12; C01P 2006/14; C01P 2006/16; C01P 2006/40; C01G 45/00; C01G 45/06; C01G 45/08; C01G 45/10; C01G 45/1271; C01G 45/1278; C01G 45/1285; C01G 45/1264; C01G 45/125; C01G 49/00; C01G 49/0072; C01G 49/02; C01G 49/04; C01G 49/06; C01G 49/08; C01G 49/10; C01G 49/12; C01G 49/14; C01G 49/018; C01G 53/00; C01G 53/04; C01G 53/08; C01G 53/10; C01G 53/66; C01G 53/68; C01G 53/70; C01G 51/00; C01G 51/08; C01G 51/085; C01G 51/006; C01G 51/66; C01G 51/68; C01G 51/70
See application file for complete search history.

(56) References Cited

FOREIGN PATENT DOCUMENTS

| JP | 2010-251070 A | 11/2010 |
|---|---|---|
| JP | 2011-228009 A | 11/2011 |
| JP | 2018-37158 A | 3/2018 |
| JP | 6664132 B2 | 3/2020 |
| JP | 2020-055704 A | 4/2020 |
| JP | 2020-113424 A | 7/2020 |

OTHER PUBLICATIONS

JP2011228009 (machine translation), Sakai et al.*
Linyi Chen et al., "Perovskite mesoporous LaFeO3 with peroxidase-like activity for colorimetric detection of gallic acid," Sensors and Actuators: B. Chemical, Jun. 15, 2020, 10 pgs.
Satoshi Suehiro et al., "Synthesis and NOx sensing evaluation of hollow/porous La0,8SrO,2MnO3 microspheres," RSC Advances, Apr. 4, 2016, 7 pgs.
Oct. 27, 2020 International Search Report issued in Patent Application No. PCT/JP2020/030323.
May 12, 2022 Notification of Reasons for Refusal issued in Japan Patent Application No. 2022-509653.
Oct. 11, 2023 Extended European Search Report issued in European Application 20948169.6.

* cited by examiner

COMPOSITE OXIDE POWDER

TECHNICAL FIELD

The present invention relates to composite oxide powders, and more particularly relates to a composite oxide powder which is suitably used as an air electrode material for a solid oxide fuel cell (SOFC: hereinafter also simply referred to as an "SOFC").

BACKGROUND ART

For example, since an SOFC has high power generation efficiency among various types of fuel cells, and a variety of fuels can be used, the SOFC is being developed as a next-generation power generation device with low environmental impact. A single SOFC has a structure in which an air electrode (cathode) of a porous structure, a dense solid electrolyte including an oxide ion conductor and a fuel electrode (anode) of a porous structure are stacked in this order (see FIG. 2). When the SOFC is operated, an $O_2$ (oxygen)-containing gas such as air is supplied to the air electrode, and a fuel gas such as $H_2$ (hydrogen) is supplied to the fuel electrode. When in this state, a current is applied to the SOFC, $O_2$ is reduced into $O^{2-}$ anions (oxygen ions) in the air electrode. Then, the $O^{2-}$ anions pass through the solid electrolyte to reach the fuel electrode, and oxidize $H_2$ to emit electrons. In this way, electrical energy is generated (that is, power is generated).

Although the operating temperature of the SOFC as described above is conventionally about 800 to 1000° C., the operating temperature of the SOFC has been attempted to be lowered in recent years. However, the minimum temperature of SOFCs in practical use is still so high as to be 600° C. or more.

Since the cell structure as described above is used and the operating temperature is high, the material of the air electrode in the SOFC is basically required to have, for example, properties in which oxygen ion conductivity is high, electronic conductivity is high, thermal expansion is equivalent or approximate to an electrolyte, chemical stability is high, compatibility with other constituent materials is satisfactory, a sintered body is porous and a constant strength is provided.

As the material of the air electrode for the SOFC as described above, perovskite-type composite oxides such as lanthanum strontium iron cobaltite (LSCF) and lanthanum strontium cobaltite (LSC) are being considered.

In the configuration of the air electrode as described above, the reaction resistance of the electrode is often reduced by the utilization of a highly active material or the use of a catalyst formed with nanoparticles. However, it is known that in a high-temperature region (700° C. or more), the mean free path (distance over which particles can travel without being disturbed by scattering (collision) caused by a scattering source) of a gas (fuel gas or air) is long, and this can cause a high electrode overvoltage as with the reaction resistance of the electrode. Hence, it is desired to achieve a higher voltage density in an electrochemical reaction cell by realizing an electrode in which the diffusion of a gas is improved without the reactivity of the electrode being impaired.

In order to achieve the improvement described above, a technique is considered which controls the porosity (aperture ratio) of an electrode to improve the diffusion of a gas (Patent Documents 1 and 2). On the other hand, as described above, it is essential to provide high reaction resistance of the electrode in order to achieve a higher voltage density, and it is necessary to further reduce the resistance of the material of the electrode. The present applicant has previously proposed a composite oxide powder which has specific magnetic properties (Patent Document 3).

RELATED ART DOCUMENT

Patent Document

Patent Document 1: Japanese Patent No. 6664132
Patent Document 2: Japanese Unexamined Patent Application Publication No. 2010-251070
Patent Document 3: Japanese Unexamined Patent Application Publication No. 2020-055704

DISCLOSURE OF THE INVENTION

Problems to be Solved by the Invention

Incidentally, since a composite oxide material having a perovskite-type structure can include, in its crystal structure, a plurality of different metal ions, the composite oxide material is being considered not only for use as an air electrode material for an SOFC but also for use in various technical fields. Since the composite oxide material having the perovskite-type structure has an oxygen defect structure for maintaining the size and the ion valence of metal ions contained and the electroneutrality thereof within its crystal so as to have various electromagnetically functional properties, in recent years, as dielectrics, in industrial electronic devices, various uses of, for example, a memory, a capacitor, a wavelength conversion element and the like are expected.

In a conductive perovskite-type composite oxide material, by the utilization of its electronic conductivity, there is a great potential for use as ceramic electrodes in various electronic devices, and attempts are made to apply the conductive perovskite-type composite oxide as a negative electrode for a lithium battery utilized in a small electronic device or the like and as a storage electrode of a high-speed storage type supercapacitor.

Furthermore, attention is given to the perovskite-type composite oxide material in which when by the utilization of a reaction in its oxygen defect, for example, the perovskite-type composite oxide material is used as an oxygen gas separation filter in a coal-fired power plant or a chemical plant, the perovskite-type composite oxide material can contribute to the reduction of impurities such as NOx that is one of global warming gases from exhaust gases.

As described above, a variety of properties are required for a perovskite-type composite oxide powder, and depending on the application, new property evaluations are being added.

Here, in particular, when the perovskite-type composite oxide powder is utilized as an electrode material for a fuel cell, in order to maximize a contact area with a gas serving as a fuel, it is preferable to maximize the number of pores serving as a path within the electrode material. However, when a large number of pores are present, the amount of electrode material existing per unit volume is decreased, with the result that there are concerns that conductivity is affected. On the other hand, although in a technique proposed in Patent Document 3, the effect of certain improvement in conductivity is observed, if further improvement in particles themselves can be achieved, it is possible to expect a much higher voltage density.

Means for Solving the Problem

The present inventors have conducted various studies to find that the problems described above can be solved by using a powder to be described below, and thereby have completed the present invention. Specifically, a composite oxide powder according to a first invention includes: a composition represented by a composition formula (1) below, the ratio α/β of a specific surface area value α (m²/g) calculated by a BET one-point method to a specific surface area value β (m²/g) calculated from a formula (2) below is greater than 1.0 and equal to or less than 1.5 and the specific surface area value α is equal to or less than 20 m²/g:

$$ABO_{3-\delta} \quad (1)$$

(in the formula, A is one or more types of elements selected from the group consisting of La, Sr, Sm, Ca and Ba, B is one or more types of elements selected from the group consisting of Fe, Co, Ni and Mn and $0 \leq \delta < 1$); and specific surface area value β (m²/g)=specific surface area value γ−specific surface area value ε    (2)

(in the formula, the specific surface area value γ (m²/g) is a cumulative value of specific surface area values in a total pore size range measured by a mercury intrusion method, and the specific surface area value ε (m²/g) is a cumulative value of specific surface area values in a pore size range of pore sizes that are larger than a 50% cumulative particle size (volume conversion-$D_{50}$) (hereinafter, also referred to as the "average particle size $D_{50}$") in a particle size distribution calculated by a Microtrac particle size distribution measuring device).

In a second invention, in the first or second invention, the specific surface area value α of the powder calculated by the BET one-point method is preferably equal to or greater than 2.5 m²/g.

In a third invention, in the first invention, the specific surface area value β is preferably equal to or greater than 1.5 m²/g.

In a fourth invention, in any one of the first to third inventions, the 50% cumulative particle size (volume conversion-$D_{50}$) is preferably in a range equal to or greater than 0.1 μm and equal to or less than 10 μm.

Preferably, in a fifth invention, in any one of the first to fourth inventions, the element included in an A site in the formula (1) is La or La and Sr, and the element included in a B site is one or more types of elements selected from the group consisting of Fe, Co and Ni.

An air electrode for a fuel cell according to a sixth invention includes the composite oxide powder obtained by any one of the first to fifth inventions.

A solid oxide fuel cell according to a seventh invention includes: a fuel electrode: a solid electrolyte; and an air electrode, and as the air electrode, the air electrode according to the sixth invention is used.

Advantages of the Invention

According to the present invention, a more highly conductive perovskite-type composite oxide powder can be realized. By using the perovskite-type composite oxide powder as described above, it is possible to realize a highly conductive air electrode for a fuel cell and a fuel cell.

DESCRIPTION OF EMBODIMENTS

Figure 1:
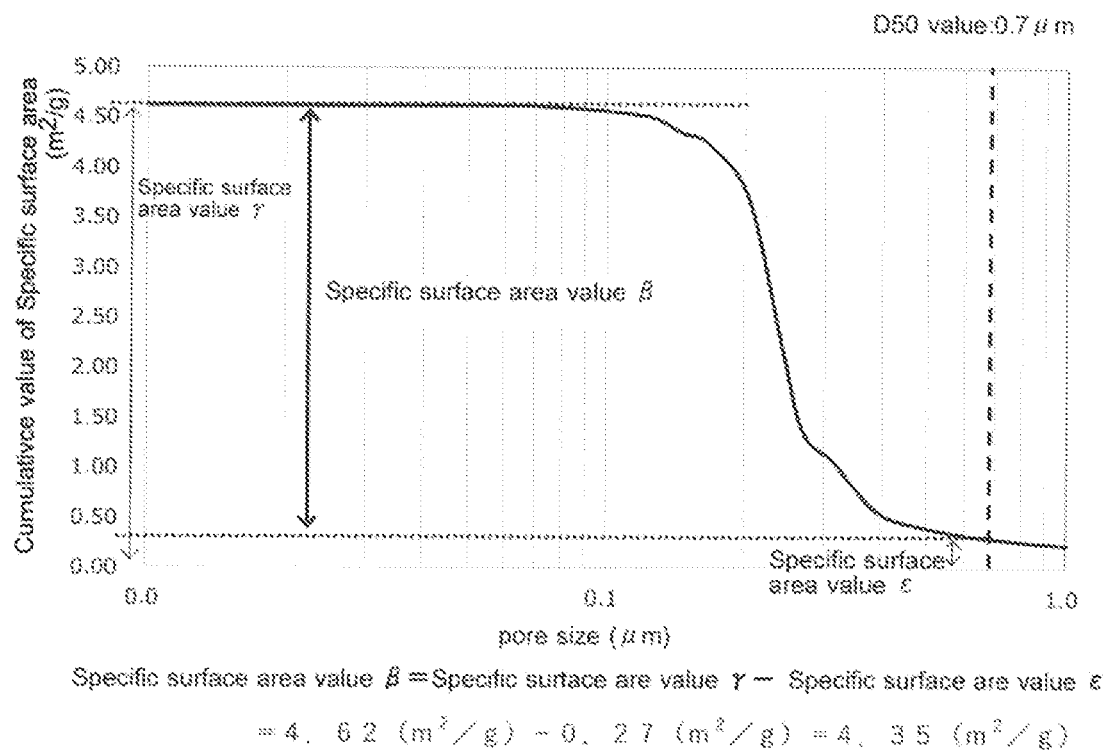
FIG. 1 is the results of pore distribution measurements of a composite oxide powder in Example 1.

One of the major features of a composite oxide powder having a perovskite-type structure according to the present invention is that the ratio α/β of a specific surface area value α (m²/g) calculated by a BET one-point method to a specific surface area value β (m²/g) calculated from the formula (2) described above is greater than 1.0 and equal to or less than 1.5.

The specific surface area measurement of the composite oxide powder performed by the BET one-point method is to measure the specific surface area of pores from micropores to mesopores whereas the specific surface area measurement of the composite oxide powder performed by the mercury intrusion method is to measure the specific surface area of pores from mesopores to micropores, and thus the ratio α/β of the specific surface area values measured by both the measurement methods serves as an index indicating the ratio of micropores. When the ratio α/β is small, it is difficult to enhance the conductivity while maintaining the porosity. By contrast, when the ratio α/β is large, though the ratio of micropores is increased, resistance within particles is increased, with the result that it is difficult to efficiently enhance the conductivity. Hence, in the present invention, the ratio α/β is determined to be greater than 1.0 and equal to or less than 1.5. In this way, it is possible to enhance the conductivity. More preferably, the ratio α/β is equal to or greater than 1.1 and equal to or less than 1.35. The specific surface area value α (m²/g) calculated by the BET one-point method in the present invention is a value which is measured by using nitrogen as an adsorption gas.

In the present invention, when the specific surface area value β (m²/g) is calculated by the mercury intrusion method, a specific surface area value γ (m²/g) which is a cumulative value of specific surface area values in a total pore size range measured by the mercury intrusion method and a specific surface area value ε (m²/g) which is a cumulative value of specific surface area values in a pore size range of pore sizes that are larger than a 50% cumulative particle size (volume conversion-$D_{50}$) in a particle size distribution calculated by a Microtrac particle size distribution measuring device are calculated. The calculation of the specific surface area value β (m²/g) is performed by "specific surface area value β=specific surface area value γ−specific surface area value ε" because since the specific surface area value γ which is the cumulative value of specific surface area values in the total pore size range measured by the mercury intrusion method is a specific surface area value obtained by cumulating not only the pores of particles but also gaps between particles, the specific surface area value ε which is the cumulative value of specific surface area values in the pore size range of pore sizes that are larger than the average particle size $D_{50}$ is subtracted, and thus the gaps between particles are removed.

Another of the major features of the composite oxide powder having the perovskite-type structure according to the present invention is that the specific surface area value α calculated by the BET one-point method is equal to or less than 20 m²/g. In a case where the specific surface area value α calculated by the BET one-point method is greater than 20 m²/g, when the composite oxide powder is formed as the air electrode, the viscosity of slurry or paint of the composite oxide powder is increased, with the result that the coating property may be adversely affected. A preferable upper limit value of the specific surface area value α is 8.0 m²/g. On the other hand, in a case where an appropriate number of pores are not present in the surfaces of the particles, when the composite oxide powder is formed as the air electrode, a contact area with an oxygen-containing gas cannot be increased, and thus the efficiency of exchange in the fuel cell is lowered, with the result that the specific surface area value α is preferably equal to or greater than 2.5 m²/g.

The average particle size $D_{50}$ of the perovskite-type composite oxide powder according to the present invention is preferably in a range equal to or greater than 0.1 μm and equal to or less than 10.0 μm, and a more preferable lower limit value of the average particle size $D_{50}$ is 0.5 μm. The particle size distribution of the perovskite-type composite oxide powder according to the present invention preferably has a single peak particle size distribution.

In the perovskite-type composite oxide powder according to the present invention, the specific surface area value β is preferably equal to or greater than 1.5 m²/g, and is more preferably equal to or greater than 2.0 m²/g. The upper limit value of the specific surface area value β is preferably 20 m²/g, more preferably 15 m²/g and further preferably 10 m²/g.

The composition of the composite oxide powder according to the present invention is the composition represented by the formula (1) described above. Specifically, the composition is represented by the general formula $ABO_{3-\delta}$, A is one or more types of elements selected from the group consisting of La (lanthanum), Sr (strontium), Sm (samarium), Ca (calcium) and Ba (barium) and B is one or more types of elements selected from the group consisting of Fe (iron), Co (cobalt), Ni (nickel) and Mn (manganese). More specifically, examples thereof include: (La, Sr) (Co, Fe) $O_{3-\delta}$-based composite oxide containing La, Sr, Co and Fe (hereinafter also referred to as the "LSCF"); (La, Sr) $CoO_{3-\delta}$-based composite oxide containing La, Sr and Co (hereinafter also referred to as the "LSC"); (La, Sr) $MnO_{3-\delta}$-based composite oxide containing La, Sr and Mn (hereinafter also referred to as the "LSM"); (La, Ni) $CoO_{3-\delta}$-based composite oxide containing La, Ni and Co (hereinafter also referred to as the "LNC"); (La, Ni) $FeO_{3-\delta}$-based composite oxide containing La, Ni and Fe (hereinafter also referred to as the "LNF"); and (Sr, Sm) $CoO_{3-\delta}$-based composite oxide containing Sr, Sm and Co (hereinafter also referred to as the "SSC"). One or two or more types of them may be mixed to be used. The perovskite-type composite oxides described above have electronic conductivity, and can be utilized, for example, as an adsorbent, a catalyst carrier, a separation film, an oxygen electrode of a fuel cell or the like, an electrode of a capacitor or the like, a member of a functional filter, a gas sensor, a lithium storage device, a dye-sensitized solar cell and the like.

Among them, the LSCF and the LCN represented by formulae below are suitable when used as the material of the air electrode for a solid oxide fuel cell. As the general formula, the LSCF is $(La_{1-x}Sr_x)_aCo_yFe_{1-y}O_{3-\delta}$ (in the formula, $0.2 \leq x \leq 0.5$, $0.1 \leq y \leq 0.6$, $0.9 \leq a \leq 1.1$). The LCN is $LaCo_yNi_{1-y}O_{3-\delta}$ (in the formula, $0.1 \leq y \leq 0.6$). La in the A site and Co, Fe and Ni in the B site may be substituted with other elements for adjustment of properties.

Although the composition of oxygen is stoichiometrically 3, oxygen may be partially deficient or may be excessively present depending on the situation. δ represents the amount of deficiency of oxygen including 0, and the range of the value of δ is $0 \leq \delta < 1$. As long as the composite oxide according to the present invention has the perovskite-type structure as main components, an inevitable impurity phase caused by other raw materials or the like may be present.

A method for manufacturing the composite oxide powder according to the present invention will then be specifically described. The composite oxide powder according to the present invention can be manufactured by any one of a dry process and a wet process.

<Dry Process>

In the dry process, the composite oxide powder is produced through steps below. The "step of drying the raw materials" of dry process step (b) can be omitted (see Example 4 to be described later).

Dry process step (a): step of mixing and pulverizing raw materials

Dry process step (b): step of drying the raw materials

Dry process step (c): burning step

Dry process step (d): step of pulverizing the burned material

Dry process step (e): step of wet-pulverizing the dry-pulverized material

Dry process step (f): step of dispersing pulverized slurry

Dry process step (g): drying step

The steps in the dry process will be described in turn below.

Dry Process Step (a): Step of Mixing and Pulverizing Raw Materials (Weighing)

Predetermined component raw materials are weighed such that the composite oxide of the intended composition having the perovskite-type structure is generated. As the component raw materials, commonly used materials can be suitably used. Examples thereof include oxides, hydroxides, nitrates, carbonates, nitrates, organic acid salts and the like containing La, Sr, Co and Fe and La, Ni and Co. Among them, for reasons of environmental aspects and availability, carbonates, hydroxides or oxides are particularly preferable. In the component raw materials, for each element, two or more types of compounds arbitrarily selected from carbonates, oxides, hydroxides, nitrates and the like can be selected as element sources.

(Pulverization)

Predetermined amounts of component raw materials which are weighed may be dry-pulverized or the component raw materials may be mixed with pure water to be pulverized.

The wet-pulverization is preferably performed with a bead mill. The material of a pulverizing medium is not limited and any material can be used as long as it has high mechanical strength. Specifically, $ZrO_2$ beads having high strength are preferable. As compared with elements such as Fe, even when contamination occurs, $ZrO_2$ has a wide allowable range. Hence, in terms of the contamination described above, the $ZrO_2$ beads are preferable. The diameter of the beads is preferably equal to or less than 2.0 mm because the efficiency of the pulverization can be ensured.

Dry Process Step (b): Step of Drying Raw Material Slurry (Drying)

Raw material slurry after the wet treatment described above is dried. A method of drying the raw material slurry by evaporation and solidification can be adopted, and a method of drying and granulating the raw material slurry (for example, with a spray drier) can also be adopted. A drying temperature for drying is equal to or greater than 60° C. and equal to or less than 350° C., and preferably equal to or greater than 100° C. and equal to or less than 250° C. It is not preferable to dry the raw material slurry in a state where the drying temperature extremely falls outside the range described above because it is likely that a part of the raw material slurry is changed into a perovskite type or the raw material slurry is not sufficiently dried and thus moisture remains in the powder.

Fine-pulverizing treatment can be performed by pulverizing the dried powder. The pulverization may be performed after the burning step which will be described later. When in the drying step described above, drying is performed with a spray drier, it is likely that the pulverization does not need to be performed. Although examples of a crusher used in the pulverization include a mortar, a sample mill, a Henschel mixer, a hammer mill, a jet mill, a pulverizer and an impeller mill, the present invention is not limited to these examples.

Dry Process Step (c): Burning Step (Burning)

The dried powder which is produced is burned in a burning furnace. As the burning furnace, a conventional burning furnace which has a heat source such as an electric or gas shuttle kiln, a roller hearth kiln or a rotary kiln can be used. In terms of increasing a filling rate within the particles of the composite oxide powder to increase the conductivity of the particles, the burning temperature is preferably equal to or greater than 850° C. and equal to or less than 1600° C. In particular, in terms of increasing the conductivity, the burning temperature is more preferably equal to or greater than 900° C. The burning temperature is preferably equal to or less than 1500° C. because it is easy to disintegrate the granulated material after the burning. The burning temperature is further preferably equal to or less than 1300° C. A burning time is preferably in a range which includes a time until the burning temperature is reached from room temperature and which is equal to or more than 30 minutes and equal to or less than 24 hours.

Dry Process Step (d): Step of Pulverizing the Burned Material (Pulverization)

The burned material which is produced is then pulverized. More specifically, the burned material is dry-pulverized. As a device for pulverizing the burned material, an impact mill, a sample mill, a Henschel mixer or the like can be used, and among them, the sample mil is suitably used. The number of revolutions of the sample mill is preferably equal to or greater than 9000 rpm and equal to or less than 18000 rpm. The number of revolutions of the sample mill and a pulverizing time are associated with the burning temperature and the burning time in the burning step, and it is preferable that as the burning temperature is higher and the burning time is longer, the number of revolutions of the sample mill and the burning time are increased.

Step (e): Step of Wet-Pulverizing the Dry-Pulverized Material

Then, the dry-pulverized material is further fine-pulverized by wet-pulverization. As a wet-pulverizing method, wet-pulverization can be performed with a wet ball mill, a sand grinder, an attritor, a pearl mill or the like. In particular, the sand grinder or the pearl mill is preferably used.

Dry Process Step (f): Step of Dispersing Pulverized Slurry

A slurry obtained after the wet-pulverization is wet-dispersed so that the specific surface area value of the burned material calculated by the BET one-point method is increased. As a wet-dispersing method, by using a device which is a homomixer, an ultrasonic homogenizer, a pressure homogenizer, an Ultimizer or the like and is different from that in step (e), wet-dispersion is performed, and thus it is possible to form the perovskite-type composite oxide under the conditions described above.

In particular, it is appropriate to perform treatment with a disperser having a strong shear force because the surfaces of the particles can be appropriately adjusted. When a device having stirring blades is used, the magnitude of the shear force can be evaluated by the peripheral speed of the stirring blades. In the present invention, the "strong shear force" indicates that the peripheral speed is equal to or greater than 5.0 (m/s), preferably equal to or greater than 7.5 (m/s) and further preferably equal to or greater than 10.0 (m/s).

Examples of the device include T.K. Homomixer (registered trademark) made by PRIMIX Corporation which is known as a turbine-stator stirrer, Ultra-Turrax (registered trademark) made by IKA Co. Ltd. and the like, and examples of a colloid mill include T. K. Mycolloider (registered trademark), T. K. Homomic Line Mill (registered trademark) and T. K. High Line Mill (registered trademark) made by PRIMIX Corporation, Static Mixer (registered trademark), High Pressure Micro Reactor (registered trademark), High Pressure Homogenizer (registered trademark) made by Noritake Company, Limited and the like. As the size of the particles is decreased, the viscosity of the slurry is increased, and thus it is possible to enhance the efficiency of treatment in the subsequent steps by adjusting desired slurry conditions. For example, when the Homomixer is used, the number of revolutions of stirring is increased, and thus it is possible to decrease the size of the particles. It is appropriate to perform the treatment with a disperser having a strong shear force caused by wet-dispersing pulverization through the addition of the steps as described above because it is possible to appropriately reduce the agglomerated particles. By performing fine-pulverization, it is possible to adjust the BET/pore surface area. Dry-pulverization is not suitable because fine-pulverization cannot be performed.

Dry Process Step (g): Drying Step

The pulverized material obtained is separated from the slurry as necessary and is washed, and thereafter, the dry-pulverized material is obtained. As a method of separating the pulverized material from the slurry, for example, any one of filtration separation, separation and collection using a filter press and a method of performing direct drying by spray drying or the like can be adopted. A drying temperature is preferably equal to or greater than 100° C. and equal to or less than 350° C., and more preferably equal to or greater than 100° C. and equal to or less than 300° C. It is not preferable to dry the pulverized material at a temperature which extremely falls outside the drying temperature range described above because it is likely that a part of the pulverized material is sintered or the pulverized material is not sufficiently dried and thus moisture remains in the perovskite-type powder.

<Wet Process>

In the wet process, the composite oxide powder is produced through steps below.

Wet process step (a): step of forming a precursor

Wet process step (b): step of dispersing raw material slurry

Wet process step (c): step of drying raw materials

Wet process step (d): burning step

Wet process step (e): pulverizing step

The steps in the wet process will be described in turn below.

Wet Process Step (a): Step of Forming a Precursor

As a manufacturing method, the following method can be adopted: a raw material solution obtained by dissolving, in water or an acid, raw materials such as a nitrate or a carbonate which are represented by the general formula $ABO_{3-\delta}$ and which include A that is one or more types of elements selected from the group consisting of La (lanthanum), Sr (strontium), Sm (samarium), Ca (calcium) and Ba (barium) and B that is one or more types of elements selected from the group consisting of Fe (iron), Co (cobalt), Ni (nickel) and Mn (manganese) is added to a previously prepared alkaline solution such as ammonia water or ammonium carbonate, and a neutralization reaction is performed to generate slurry containing the neutralization product of a perovskite-type composite oxide.

The generated neutralization product preferably contains carbonic acid. In this way, when the neutralization product (in the present specification, also referred to as a "precursor") is separated and collected, a phenomenon is suppressed in which the neutralization product reacts with carbon dioxide in the air to locally form into a carbonate so as to enter a crystalline state. Consequently, the precipitation of an impurity phase caused when a perovskite type is formed in the subsequent steps is suppressed, and thus the neutralization product preferably contains carbonic acid. As the addition of carbonic acid into this system, the addition of a carbonate is preferable. Since the resulting neutralization product is amorphous nanoparticles in which the individual elements are uniformly mixed, the elements are easily diffused at the time of burning, with the result that an effect of facilitating change into a single phase and the growth of crystallite is obtained.

A temperature at which the neutralization product is formed is preferably equal to or less than 60° C., more preferably equal to or less than 50° C. and further preferably equal to or less than 40° C. The temperature setting as described above is made, and thus materials such as carbonic acid and ammonia which are included in the solution and are easily formed into gases are dispersed as gases, with the result that the neutralization product can be suitably obtained. Since the neutralization product of the perovskite-type composite oxide obtained in the present embodiment is amorphous nanoparticles in which the individual elements are uniformly mixed, the elements are easily diffused at the time of burning, with the result that an effect of facilitating change into a single phase and the growth of crystallite is obtained.

Wet Process Step (b): Step of Dispersing Raw Material Slurry

It is appropriate to wet-disperse the slurry obtained so that the specific surface area of the burned material calculate by the BET one-point method is increased. As an example of a wet-dispersing method, the device which is described as an example in dry process step (f) can be used. The amorphous nanoparticles serving as the raw materials are dispersed with a strong shear force, and thus it is possible to adjust the ratio $\alpha/\beta$ of the product.

In particular, examples include T.K. Homomixer (registered trademark) made by PRIMIX Corporation which is known as a turbine-stator stirrer, Ultra-Turrax (registered trademark) made by IKA Co. Ltd. and the like, and examples of a colloid mill include T. K. Mycolloider (registered trademark), T. K. Homomic Line Mill (registered trademark) and T. K. High Line Mill (registered trademark) made by PRIMIX Corporation, Static Mixer (registered trademark), High Pressure Micro Reactor (registered trademark), High Pressure Homogenizer (registered trademark) made by Noritake Company, Limited and the like. For example, when the Homomixer is used, the number of revolutions of stirring is increased, and thus it is possible to effectively reduce the agglomerated particles.

Wet Process Step (c): Step of Drying the Raw Materials

The neutralization product obtained is separated from the slurry as necessary, and is washed and thereafter dried, and thus a precursor formed by drying the neutralization product is obtained. As a method of separating the neutralization product from the slurry, for example, any one of filtration separation, separation and collection using a filter press and a method of performing direct drying by spray drying, freeze drying or the like can be adopted. In each of the filtration separation and the filter press, a known method can be adopted. When the direct drying is performed, pH adjustment may be performed so that the precursor obtained is adjusted to have a desired size or the like. Preferably, in the pH adjustment, instead of using an adjustment agent containing an alkali metal such as sodium hydroxide or potassium hydroxide to prevent impurities such as an alkali metal and an alkaline earth metal from being left in the dry-agglomerated material, ammonia or the like which is unlikely to be left by being volatilized at the time of drying is used to make the adjustment. A drying temperature for drying the neutralization product is preferably equal to or greater than 150° C. and equal to or less than 350° C., and more preferably equal to or greater than 200° C. and equal to or less than 300° C. It is not preferable to dry the neutralization product at a temperature which extremely falls outside the dry temperature range described above because it is likely that a part of the neutralization product is changed into a perovskite type or the neutralization product is not sufficiently dried and thus moisture remains in the precursor powder.

Wet Process Step (d): Burning Step

Then, the dried precursor is subjected to heat treatment (burning), and thus a composite oxide having a perovskite-type crystal structure is obtained. Although the burning temperature is not particularly limited as long as the perovskite-type crystal structure is obtained, in terms of increasing a filling rate within the particles of the composite oxide powder to increase the conductivity of the particles, the burning temperature is preferably equal to or greater than 850° C. and equal to or less than 1600° C. In particular, in terms of increasing the conductivity, the burning temperature is more preferably equal to or greater than 900° C. The burning temperature is preferably equal to or less than 1500° C. because it is easy to disintegrate the granulated material after the burning. The burning temperature is further preferably equal to or less than 1300° C. The burning time is preferably in a range which includes a time until the burning temperature is reached from room temperature and which is equal to or more than 30 minutes and equal to or less than 24 hours.

Wet Process Step (e): Pulverizing Step

Then, the granulated material (burned material) after the burning is pulverized. For the pulverization, either wet-pulverization or dry-pulverization may be performed, only one of wet-pulverization and dry-pulverization may be performed and both of them may be performed. When the wet-pulverization is performed, the wet-pulverization may be performed in multiple stages.

As a device for dry-pulverizing the burned material, an impact mill, a sample mill, a Henschel mixer or the like can be used, and among them, the sample mil is suitably used. The number of revolutions of the sample mill is preferably equal to or greater than 9000 rpm and equal to or less than 18000 rpm. The number of revolutions of the sample mill and the pulverizing time are associated with the burning temperature and the burning time in the burning step, and it is preferable that as the burning temperature is higher and the burning time is longer, the number of revolutions of the sample mill and the burning time are increased.

As a wet-pulverizing method, by using a wet ball mill, a sand grinder, an attritor, a pearl mill, an ultrasonic homogenizer, a pressure homogenizer, an Ultimizer or the like, wet-pulverization or wet-crushing is performed, and thus it is possible to form the perovskite-type composite oxide under the conditions described above. In particular, the pearl mill is preferably used. When the pearl mill is selected to perform wet-pulverization, though the pulverization can be performed with any one of existing wet-pulverizers such as a vertical flow tube-type bead mill, a horizontal flow tube-type bead mill and a strong pulverizing burst-type viscomill, the horizontal flow tube-type bead mill is preferably used. The horizontal flow tube-type bead mill is suitable because as compared with the vertical flow tube-type bead mill, the horizontal flow tube-type bead mill performs uniform pulverization while being stayed within a vessel to be able to perform uniform pulverization at the same flow rate. The horizontal flow tube-type bead mill is economically preferable because the horizontal flow tube-type bead mill has a high treatment flow rate as compared with the strong pulverizing burst-type viscomill. As a pulverizing medium, a ball manufactured of a hard raw material such as glass, ceramics, alumina or zirconia is preferably used. As a solvent, water, ethanol or the like is used, the burned material is put and a bead mill or the like can be used. The pulverized material obtained by wet-pulverization is separated from the slurry as necessary and is washed, and thereafter, the dry-pulverized material is obtained. As a method of separating the pulverized material from the slurry, for example, any one of filtration separation, separation and collection using a filter press and a method of performing direct drying by spray drying, freeze drying or the like can be adopted. The drying temperature is preferably equal to or greater than 100° C. and equal to or less than 350° C., and more preferably equal to or greater than 100° C. and equal to or less than 300° C.

(Air Electrode for Solid Oxide Fuel Cell)

The composite oxide powder described above is suitably used as an air electrode for a solid oxide fuel cell. Specifically, the composite oxide powder of the present invention is sintered as a molded body, and thus the molded sintered body can be suitably used as an air electrode for a solid oxide fuel cell.

As a means for forming the sintered body, a means itself which is known is applied. For example, the composite oxide powder of the present invention is first mixed with a binder and is filled in a mold having a certain volume, a pressure is applied from above and thus the molded body of the powder is produced. A method of applying a pressure is not particularly limited, and examples thereof include a mechanical uniaxial press, a cold isostatic pressure (CIP) press and the like. Then, the molded body is subjected to heat treatment, and thus the sintered body is obtained. A heat treatment temperature is preferably equal to or greater than 1000° C. and equal to or less than 1450° C. When the heat treatment temperature is equal to or greater than 1000° C., the mechanical strength of the molded body is sufficiently kept whereas the heat treatment temperature is preferably equal to or less than 1450° C. because there is no possibility that a part of the generated composite oxide powder is decomposed to form an impurity and thus the composition becomes non-uniform. A heat treatment time is preferably equal to or more than 2 hours and equal to or less than 24 hours.

(Porosity)

In a case where the perovskite-type composite oxide powder of the present invention is used as an air electrode material, a large number of small pores are formed when the air electrode is formed by sintering, and thus a high open porosity is obtained and high conductivity is obtained. When the porosity of a sintered body obtained by producing the perovskite-type composite oxide powder in a method described later, under the heading Production of sintered body and measuremnet of conductivity is equal to or greater than 25%, the perovskite-type composite oxide powder can be utilized as an air electrode for a fuel cell.

(Solid Oxide Fuel Cell, SOFC)

Figure 2:
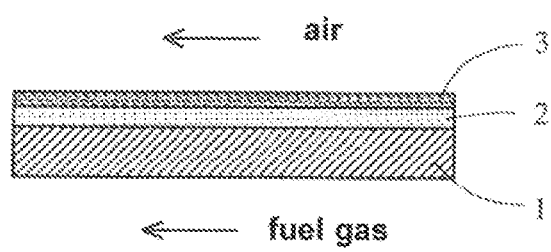
FIG. 2 is a cross-sectional configuration view schematically showing an example of a solid oxide fuel cell.

A solid oxide fuel cell will be described. FIG. 2 is across-sectional configuration view schematically showing an example of a solid oxide fuel cell. The solid oxide fuel cell has a structure in which a fuel electrode 1 in a thin plate shape or a sheet shape which serves as a support member, a solid electrolyte 2 which is formed on the surface of the fuel electrode 1 and an air electrode 3 in a thin plate shape or a sheet shape which is formed on the surface of the solid electrolyte 2 are stacked.

When a fuel gas (which is typically hydrogen ($H_2$) but may be hydrocarbon (methane ($CH_4$)) or the like) is supplied to the fuel electrode 1, a gas (air) containing oxygen ($O_2$) is passed to the air electrode 3 and a current is applied to the fuel cell, in the air electrode 3, the oxygen in the air forms into oxide ions. The oxide ions are supplied to the fuel electrode 1 from the air electrode 3 through the solid electrolyte 2. Then, in the fuel electrode 1, the oxide ions react with the fuel gas to generate water ($H_2O$), and thus electrons are emitted to generate electricity.

Although the SOFC depends on the configuration of a fuel cell which is applied and the manufacturing process thereof, the multilayer of the fuel electrode, the solid electrolyte and the like is previously produced, on the multilayer, by a print method, evaporation or the like, a layer containing the air electrode material described above is formed and sintered and thus the air electrode is formed, with the result that the fuel cell is produced.

Although the film thickness of the air electrode is not particularly limited and is preferably determined as necessary according to the structure and the like of the cell, for example, the film thickness is preferably equal to or greater than 20 μm and equal to or less than 50 μm.

For the solid electrolyte layer, an electrolyte material used in the air electrode material described above can be used, and examples thereof include a rare earth element-doped ceria-based solid oxide electrolyte and a rare earth element-doped zirconia-based solid oxide electrolyte.

The film thickness of the solid electrolyte is set in a balanced manner such that the solid electrolyte is thick enough to maintain the denseness of the solid electrolyte layer and is thin enough to provide conductivity of oxygen ions or hydrogen ions suitable for a fuel cell. The film thickness is preferably equal to or greater than 0.1 m and equal to or less than 50 m, and more preferably equal to or greater than 1 μm and equal to or less than 20 μm.

The fuel electrode is preferably formed to have a porous structure and to be able to make contact with the supplied fuel gas, and a material which is conventionally used for a solid oxide fuel cell can be used. Examples thereof include metal oxides formed of one or more types selected from metals and/or metal elements such as nickel (Ni), copper (Cu), gold (Au), platinum (Pt), palladium (Pd), ruthenium (Ru) and other platinum group elements, cobalt (Co), lanthanum (La), strontium (Sr) and titanium (Ti). One or two or more types thereof may be mixed to be used.

In terms of durability, a thermal expansion coefficient and the like, the film thickness of the fuel electrode is preferably equal to or greater than 20 μm and equal to or less than 1 μm, and more preferably equal to or greater than 20 μm and equal to or less than 250 μm.

The structure of the SOFC can be formed in a flat shape, a polygonal shape, a cylindrical (tubular) shape, a flat cylindrical (flat tubular) shape obtained by vertically crushing the circumferential side of a cylinder or the like, which is conventionally known, and the shape and the size thereof are not particularly limited. As a flat SOFC, in addition to a fuel electrode support type (ASC: Anode-supported Cell), for example, an electrolyte support type (ESC: Electrolyte-Supported Cell) in which an electrolyte is thick, an air electrode support type (CSC: Cathode-Supported Cell) in which an air electrode is thick and the like can be used. Moreover, a metal support cell (MSC: Metal-Supported Cell) in which a porous metal sheet is put under a fuel electrode can be provided.

The present invention will be more specifically described below with reference to Examples. Manufacturing conditions and the physical properties of samples obtained in Examples and Comparative Examples are shown in table 1.

Example 1

Wet Process Step (a): Step of Forming a Precursor 243 g of a solution (La concentration: 14.88% by mass, $NO_3^-$: 270 g/L) obtained by dissolving lanthanum oxide in nitric acid, 39 g of strontium nitrate ($Sr(NO_3)_2$), 142 g of iron nitrate 9-hydrate ($Fe(NO_3)_3 \cdot 9H_2O$) and 27 g of cobalt nitrate hexahydrate ($Co(NO_3)_2 \cdot 6H_2O$) were dissolved in 550 g of ion-exchange water, and thus a mixed solution A of nitrate was produced.

2700 g of ion-exchange water and 190 g of ammonium carbonate were put into a reaction chamber, and were adjusted while being stirred such that the water temperature was 25° C. The mixed solution A of nitrate was gradually added into the ammonium carbonate solution, a neutralization reaction was performed, a precursor of a perovskite-type composite oxide was precipitated, the precursor was thereafter aged for 30 minutes and the reaction was completed.

Wet Process Step (b): Step of Dispersing Raw Material Slurry

The precursor obtained in this way was filtered and then washed with water, and was emulsified and dispersed at 8000 rpm for 5 minutes with a high-speed emulsifying/dispersing machine (TK Homomixer Mark II made by PRIMIX Corporation), and thus the dispersion slurry of a raw material powder was obtained. The peripheral speed of the stirring blades of the high-speed emulsifying/dispersing machine was set to 12.57 (m/s).

Wet Process Step (c): Step of Drying the Raw Materials

A solid material was separated and collected from the dispersion slurry. A wet cake obtained was molded into an elongated cylindrical pellet shape with a diameter of 5 mm. Immediately after the molding, the pellet-shaped molded body was heated and dried at 250° C. for 2 hours while being ventilated by air, and thus a black dry powder was obtained.

Wet Process Step (d): Burning Step 50 g of the dry powder obtained was put into a round crucible (container having a diameter of 90 mm and a height of 75 mm), was set into an electric muffle furnace (KM-160 made by TOYO ENGINEERING WORKS, LTD.), was increased in temperature from room temperature to 990° C. (burning temperature), was held at the burning temperature for 2 hours to be burned and was then naturally cooled to room temperature.

Wet Process Step (e): Pulverizing Step

On 20 g of the burned material obtained, dry-pulverization treatment was repeated twice at the rotation speed of 16000 rpm for 30 seconds with a sample mill pulverizer (model name: SK-M10) made by Kyoritsu Riko Co., Ltd., and thus a perovskite-type composite oxide powder according to Example 1 was obtained.

(Composition Analysis)

On the perovskite-type composite oxide powder obtained, composition analysis was performed with an inductively coupled plasma (ICP) emission spectrometer (720ES made by Agilent Technologies, Inc.).

(Specific Surface Area Measurement Using BET One-Point Method)

On the perovskite-type composite oxide powder obtained, a measurement was performed with a BET specific surface area measuring device (HM model-1210 made by Mountech Co., Ltd.) by a BET one-point method using nitrogen adsorption. In the measurement performed by the BET one-point method, degassing conditions before the measurement were set to 105° C. and 20 minutes.

(Mercury Intrusion Method Measurement)

For the measurement of the status of pores performed by the mercury intrusion method, 0.3 to 0.5 g of a sample of the perovskite-type composite oxide powder was measured with Auto Pore V 9620 model made by Micrometitics Instrument Corporation in a range of 0.4 to 30000 psia.

Measuring device: Auto Pore V 9620 model
Measurement pressure: 0.4 to 30000 psia
Number of steps: 65
Measurement mode: automatic measurement
Mercury contact angle: 130°
Mercury surface tension: 485 dyne/cm
Measurement sample mass: 0.3 to 0.5 g
Measurement temperature: 22° C.

Since in the mercury intrusion method, gaps between particles are also measured, in order to remove the gaps between particles, the specific surface area value $\beta$ ($m^2/g$) calculated by the mercury intrusion method is calculated as follows: the specific surface area value $\gamma$ ($m^2/g$) which is the cumulative value of specific surface area values in a total pore size range measured by the mercury intrusion method and the specific surface area value $\varepsilon$ ($m^2/g$) which is the cumulative value of specific surface area values in a pore size range of pore sizes that are larger than the average particle size $D_{50}$ of the perovskite-type composite oxide powder are calculated, and thus the specific surface area value $\beta$ ($m^2/g$) was calculated by "specific surface area value $\beta$=specific surface area value $\gamma$−specific surface area value $\varepsilon$". However, when data collection for the mercury intrusion method is intermittent, the lower limit of the specific surface area value $\varepsilon$ is set to a value larger than the average particle size $D_{50}$ of the perovskite-type composite oxide powder. For example, in a case where, as data, specific surface area values when pore sizes are 0.76 μm, 0.61 μm and 0.49 μm are individually calculated, and the average particle size $D_{50}$ is 0.7 μm, the lower limit of the pore size for calculating the specific surface area value $\varepsilon$ is set to 0.76 μm, with the result that the cumulative value (specific surface area value $\varepsilon$) of specific surface area values which are equal to or greater than 0.76 μm is calculated.

(50% Cumulative Particle Size (Volume Conversion-$D_{50}$), Average Particle Size $D_{50}$)

0.15 g of the perovskite-type composite oxide powder obtained was added to 60 mL of water containing 500 ppm of sodium hexametaphosphate, an ultrasonic homogenizer was used to perform dispersion for 2 minutes so as to obtain the perovskite-type composite oxide powder and slurry containing the perovskite-type composite oxide powder was used to measure the 50% cumulative particle size (volume conversion-$D_{50}$), of the perovskite-type composite oxide powder with the Microtrac particle size distribution measuring device (MT3300EXII made by NIKKISO CO., LTD.) (with a particle refractive index set to 2.40, a solvent refractive index set to 1.333 and a calculation mode set to MT3000II).

(Production of Sintered Body and Measurement of Conductivity)

For the measurement of the conductivity of an air electrode, an air electrode material was formed into a pellet, and a source meter (Series 2400 Source Meter made by Keithley Instruments) was used to measure the conductivity. Specifically, a pellet production press was used to apply a molding pressure of 4 MPa to the perovskite-type composite oxide powder, and thus a pellet-shaped molded body was obtained. The molded body was increased in temperature at 5° C./min, was held at 1050° C. for 2 hours, was thereafter naturally decreased in temperature and thus a conductivity measurement pellet was obtained. A platinum wire having a diameter of 0.2 mm was wound at a total of four parts of the pellet obtained at intervals of 3.5 mm in both ends and the inside. A sample surface and the platinum wire were bonded using silver paste. The pellet was increased in temperature from 25° C. to 700° C. with an electric heater, and was held at 700° C., a 4-terminal method for the source meter was used to apply a current to terminals at both ends while a current value was being changed by 10 mA from "30 mA" to "−30 mA" and voltage values generated at terminals inside were measured. A resistance value was calculated from a relationship between the voltages and the currents obtained at 6 parts. Then, conductivity σ was calculated from a formula below.

Conductivity $\sigma = L/(R \times b \times d)$ (in the formula, L represents a distance between voltage terminals, b×d represents a cross-sectional area and R represents resistance).

(Porosity of Sintered Body)

The porosity of the molded sintered body obtained by sintering the perovskite-type composite oxide powder as a molded body was measured in accordance with the Japanese Industrial Standard JIS R1634: 1998 Method for Measuring Sintered Body Density and Open Porosity of Fine Ceramics. A sample which was formed into a pellet was dried in a constant temperature bath having a temperature of 110±5° C., and was allowed to cool in a desiccator, and thus the mass thereof was measured. This operation was repeated, and a mass when a constant volume was reached was assumed to be a dry mass $W_1$. After the dry mass was measured, the sample was placed on the bottom of a vacuum container, suction was performed for 15 minutes under a vacuum of 2.0 kPa or less, air in the pores of the powder was sufficiently removed and thereafter water was injected. In this case, water was injected until the sample was completely immersed, here a cock was gradually opened to return the pressure to atmospheric pressure and thereafter the sample was left to stand for 30 minutes. Here, a vacuum pump was operated during the injection of a medium liquid, and was stopped after the injection. A mass in water of a saturated sample was measured with the saturated sample suspended in water by a wire, and a value obtained by correcting the mass of a jig was assumed to be a mass in water $W_2$. For the mass of the saturated sample, the saturated sample was taken out of water, the surface was quickly wiped with a damp gauze to remove water droplets, thereafter the mass was measured and the measured mass was assumed to be a saturated mass $W_3$. Here, the gauze was caused to contain sufficient water and was thereafter squeezed enough to remove only the water droplets on the surface of the sample. An open porosity Po (%) was calculated by a formula below, and was rounded to one decimal place in accordance with JIS Z 8401.

$Po = (W_3 - W_1)/(W_3 - W_2) \times 100$

Example 2

Wet Process Step (d): Burning Step

A black dry powder was obtained by the same method as the steps of (a) to (c) in Example 1. 50 g of the dry powder obtained was put into a round crucible (container having a diameter of 90 mm and a height of 75 mm), was set into the electric muffle furnace (KM-160 made by TOYO ENGINEERING WORKS, LTD.), was increased in temperature from room temperature to 1080° C. (burning temperature), was held at the burning temperature for 2 hours to be burned and was then naturally cooled to room temperature.

Wet Process Step (e1): Dry-Pulverizing Step

On the burned material obtained, pulverization treatment was repeated twice, with a preparation volume of 20 g for each time, at the rotation speed of 16000 rpm for 30 seconds with the sample mill pulverizer (model name: SK-M10, made by Kyoritsu Riko Co., Ltd.), and thus a perovskite-type composite oxide powder according to Example 2 was obtained.

Example 3

Wet Process Step (e2): Wet-Pulverizing Step

The composite oxide powder obtained in Example 2 was further wet-pulverized, and thus a perovskite-type composite oxide powder according to Example 3 was obtained. Specifically, 200 g of $ZrO_2$ beads having a diameter of 1.0 mm, 117 g of pure water and 50 g of the perovskite-type composite oxide powder produced in Example 2 were put into the pot of a four-tube sand grinder (TSG-4U type, capacity: 350 ml) made by IMEX Co., Ltd. While the pot was being cooled with cooling water of 20° C., pulverization treatment was performed at the rotation speed of 1500 rpm for 50 minutes, and thus slurry containing the pulverized material of the perovskite-type composite oxide powder as a solid content was obtained. Thereafter, the slurry obtained was filtered to be separated and was dried at 125° C., and thus the perovskite-type composite oxide powder according to Example 3 was obtained.

Comparative Example 1

Dry Process Step (a): Step of Producing Raw Material Slurry

First, in order to obtain a composite oxide powder having a composition of $La_{0.6}Sr_{0.4}Co_{0.2}Fe_{0.8}O_{3-\delta}$, 173 g of $La_2O_3$, 105 g of $SrCO_3$, 29 g of $CO_3O_4$, 112 g of $Fe_2O_3$, 643 g of pure water and 21 g of a polyacrylic acid-based dispersant were weighed.

The mixed powder obtained, 2280 g of ZrO beads having a diameter of 1.75 mm and the raw materials, pure water and the dispersant described above were put into the vessel of a bead mill made by Igarashi Machine Industry Co., Ltd. (model name: SLG-1/2G, capacity: 2.0 L). While the pot was being cooled with cooling water of 20° C., pulverization treatment was performed at the rotation speed of 1500 rpm for 60 minutes, and thus raw material slurry was produced.

Dry Process Step (b): Step of Drying the Raw Material Slurry (1) Pure water was added to the raw material slurry, and thus the solid content concentration of the powder in the raw material slurry was adjusted to be 60% by mass.

(2) The number of revolutions of a disk in a spray drier (L-12 type made by OHKAWARA KAKOHKI CO., LTD.) was set to 25000 rpm, the inlet temperature of a drying hot air temperature was set to 165° C., the outlet temperature was set to 65° C. and the supply speed of the raw material slurry was set to 10 kg/h, and the raw material slurry was spray-dried, with the result that a granulated material was obtained. When the particle size distribution of the dry granulated material was measured with the Microtrac particle size distribution measuring device (MT3300EXII made by NIKKISO CO., LTD.) (with a particle refractive index set to 2.40 and a calculation mode set to HRAMT3000II), the average particle size $D_{50}$ of the dry granulated material was 27 μm.

Then, on the dry granulated material obtained, pulverization treatment was repeated twice, with a preparation volume of 50 g for each time, at the rotation speed of 16000 rpm for 30 seconds with the sample mill pulverizer (model name: SK-M10, made by Kyoritsu Riko Co., Ltd.), and thus a dry-pulverized material was obtained.

Dry Process Step (c): Burning Step 50 g of the dry-pulverized material obtained was put into a round crucible (container having a diameter of 90 mm and a height of 75 mm), was set into the electric muffle furnace (KM-160 made by TOYO ENGINEERING WORKS, LTD.), was increased in temperature from room temperature to 1080° C. (burning temperature), was held at the burning temperature for 2 hours to be burned and was then naturally cooled to room temperature.

Dry Process Step (d): Step of Pulverizing Burned Material

On the burned material obtained, pulverization treatment was repeated twice, with a preparation volume of 20 g/B for each time, at the rotation speed of 16000 rpm for 30 seconds with the sample mill pulverizer (model name: SK-M10, made by Kyoritsu Riko Co., Ltd.), and thus a perovskite-type composite oxide powder according to Comparative Example 1 was obtained. After the pulverized material was put into pure water and ultrasonic treatment was performed with an ultrasonic output of 40 W for 6 minutes, the pore size distribution of the particles obtained was measured with the Microtrac particle size distribution measuring device (MT3300EXII made by NIKKISO CO., LTD.) (with a particle refractive index set to 2.40, a solvent refractive index set to 1.333 and a calculation mode set to MT3000II).

Comparative Example 2

Dry Process Step (e): Step of Wet-Pulverizing Dry-Pulverized Material

The composite oxide powder obtained in Comparative Example 1 was further wet-pulverized, and thus a perovskite-type composite oxide powder according to Comparative Example 2 was obtained. Specifically, 200 g of $ZrO_2$ beads having a diameter of 1.0 mm, 117 g of pure water and 50 g of the perovskite-type composite oxide were put into the pot of the four-tube sand grinder (TSG-4U type, capacity: 350 ml, made by IMEX Co., Ltd). While the pot was being cooled with cooling water of 20° C., pulverization treatment was performed at the rotation speed of 1500 rpm for 50 minutes, and thus slurry containing the pulverized material of the perovskite-type composite oxide as a solid content was obtained. The slurry obtained was filtered to be separated and was dried at 125° C., and thus the perovskite-type composite oxide powder according to Comparative Example 2 was obtained. After the pulverized material was put into pure water and ultrasonic treatment was performed with an ultrasonic output of 40 W for 6 minutes, the pore size distribution of the particles obtained was measured with the Microtrac particle size distribution measuring device (MT3300EXII made by NIKKISO CO., LTD.) (with a particle refractive index set to 2.40, a solvent refractive index set to 1.333 and a calculation mode set to MT3000II).

Comparative Example 3

Dry Process Step (a): Step of Pulverizing Raw Materials (Raw Material Mixing)

(1) In order to obtain a composite oxide powder having a composition of $La_{1.0}Co_{0.4}Ni_{0.6}O_{3-\delta}$, 13.5 g of $La_2O_3$, 2.7 g of C0304 and 3.7 g of NiO were weighed, and were mixed in a mortar for 30 minutes, and thus a raw material mixture was obtained. The operation described above was repeated until a necessary predetermined amount was reached.

Dry Process Step (c): Burning Step (Burning)

50 g of the mixture obtained was put into a round crucible (container having a diameter of 90 mm and a height of 75 mm), was set into the electric muffle furnace (KM-160 made by TOYO ENGINEERING WORKS, LTD.), was increased in temperature from room temperature to 1250° C. (burning temperature), was held at the burning temperature for 2 hours to be burned and was then naturally cooled to room temperature.

Dry Process Step (d): Step of Pulverizing the Burned Material (Pulverization)

On the burned material obtained, pulverization treatment was repeated twice, with a preparation volume of 20 g for each time, at the rotation speed of 16000 rpm for 30 seconds with the sample mill pulverizer (model name: SK-M10, made by Kyoritsu Riko Co., Ltd.), and thus a perovskite-type composite oxide powder according to Comparative Example 3 was obtained.

Example 4

Dry Process Step (e): Step of Wet-Pulverizing the Dry-Pulverized Material

The composite oxide powder obtained in Comparative Example 3 was further wet-pulverized, and thus a perovskite-type composite oxide powder according to Example 4 was obtained. Specifically, 200 g of $ZrO_2$ beads having a diameter of 1.0 mm, 117 g of pure water and 50 g of the perovskite-type composite oxide were put into the pot of the four-tube sand grinder (TSG-4U type, capacity: 350 ml, made by IMEX Co., Ltd.). While the pot was being cooled with cooling water of 20° C., pulverization treatment was performed at the rotation speed of 1500 rpm for 85 minutes.

Dry Process Step (f): Step of Dispersing Pulverized Slurry

The perovskite-type composite oxide powder was emulsified and dispersed at 8000 rpm for 5 minutes with the high-speed emulsifying/dispersing machine (TK Homomixer Mark II made by PRIMIX Corporation), and thus the dispersion slurry of the raw material powder was obtained. Thereafter, a solid material was separated and collected from the slurry, and slurry containing the pulverized material of the perovskite-type composite oxide as a solid content was obtained. The slurry obtained was filtered to be separated and was dried at 125° C., and thus the perovskite-type composite oxide powder according to Example 4 was obtained. The peripheral speed of the stirring blades of the high-speed emulsifying/dispersing machine was set to 12.57 (m/s).

Comparative Example 4

Dry Process Step (a): Step of Pulverizing Raw Materials (Production of Raw Material Slurry)

In order to obtain a composite oxide powder having a composition of $La_{1.0}Co_{0.4}Ni_{0.6}O_{3-\delta}$, 68 g of $La_2O_3$, 13.5 g of $CO_3O_4$, 19 g of NiO, 99 g of pure water and 1.5 g of acetic acid were weighed.

Then, 200 g of $ZrO_2$ beads having a diameter of 1.75 mm and the raw materials, pure water and the acetic acid described above were put into the pot of the four-tube sand grinder (TSG-4U type, capacity: 350 ml, made by IMEX Co., Ltd.). While the pot was being cooled with cooling water of 20° C., pulverization treatment was performed at the rotation speed of 1500 rpm for 60 minutes, and thus raw material slurry was produced.

Dry Process Step (b): Step of Drying the Raw Materials (Drying)

Then, the slurry was dried at 125° C. On the dried material obtained, pulverization treatment was repeated twice, with a preparation volume of 50 g for each time, at the rotation speed of 16000 rpm for 30 seconds with the sample mill pulverizer (model name: SK-M10, made by Kyoritsu Riko Co., Ltd.), and thus a dry-pulverized material was obtained.

Dry Process Step (c): Burning Step (Burning)

50 g of the dry-pulverized material obtained was put into a round crucible (container having a diameter of 90 mm and a height of 75 mm), was set into the electric muffle furnace (KM-160 made by TOYO ENGINEERING WORKS, LTD.), was increased in temperature from room temperature to 1080° C. (burning temperature), was held at the burning temperature for 2 hours to be burned and was then naturally cooled to room temperature.

Dry Process Step (d): Step of Pulverizing the Burned Material (Pulverization)

On the burned material obtained, pulverization treatment was repeated twice, with a preparation volume of 20 g for each time, at the rotation speed of 16000 rpm for 30 seconds with the sample mill pulverizer (model name: SK-M10, made by Kyoritsu Riko Co., Ltd.), and thus a perovskite-type composite oxide powder according to Comparative Example 4 was obtained.

Example 5

Dry Process Step (e): Step of Wet-Pulverizing Dry-Pulverized Material

The composite oxide powder obtained in Comparative Example 4 was further wet-pulverized, and thus a perovskite-type composite oxide powder according to Example 5 was obtained. Specifically, 200 g of $ZrO_2$ beads having a diameter of 1.0 mm, 117 g of pure water and 50 g of the perovskite-type composite oxide were put into the pot of the four-tube sand grinder (TSG-4U type, capacity: 350 ml, made by IMEX Co., Ltd). While the pot was being cooled with cooling water of 20° C., pulverization treatment was performed at the rotation speed of 1500 rpm for 60 minutes. Thereafter, the perovskite-type composite oxide powder was emulsified and dispersed at 8000 rpm for 5 minutes with the high-speed emulsifying/dispersing machine (TK Homomixer Mark II made by PRIMIX Corporation), and thus the dispersion slurry of the raw material powder was obtained. Thereafter, a solid material was separated and collected from the slurry, and the pulverized material of the perovskite-type composite oxide was obtained as a solid content. The solid material obtained was dried at 125° C., and thus the perovskite-type composite oxide powder according to Example 5 was obtained. The peripheral speed of the stirring blades of the high-speed emulsifying/dispersing machine was set to 12.57 (m/s).

After the pulverized material was put into water serving as a solvent and ultrasonic treatment was performed with an ultrasonic output of 40 W for 6 minutes, the pore size distribution of the particles obtained was measured with the Microtrac particle size distribution measuring device (MT3300EXII made by NIKKISO CO., LTD.) (with a particle refractive index set to 2.40, a solvent refractive index set to 1.333 and a calculation mode set to MT3000II).

Example 6

Wet Process Step (a): Step of Forming a Precursor 535 g of a solution (La concentration: 15.17% by mass, $NO_3^-$: 270 g/L) obtained by dissolving lanthanum oxide in nitric acid, 73 g of cobalt nitrate hexahydrate $(Co(NO_3)_2 \cdot 6H_2O)$, 123 g of nickel nitrate hexahydrate (Ni $(NO_3)_2 \cdot 6H_2O$) were dissolved in 269 g of ion-exchange water, and thus a mixed solution A of nitrate was produced.

2650 g of ion-exchange water and 216 g of ammonium carbonate were put into a reaction chamber, and were adjusted while being stirred such that the water temperature was 30° C. The mixed solution A of nitrate was gradually added into the ammonium carbonate solution, a neutralization reaction was performed, a precursor of a perovskite-type composite oxide was precipitated, the precursor was thereafter aged for 30 minutes and the reaction was completed.

Wet Process Step (b): Step of Dispersing Raw Material Slurry

The precursor obtained in this way was filtered and then washed with water, and was emulsified and dispersed at 8000 rpm for 5 minutes with the high-speed emulsifying/dispersing machine (TK Homomixer Mark II made by PRIMIX Corporation), and thus the dispersion slurry of a raw material powder was obtained. The peripheral speed of the stirring blades of the high-speed emulsifying/dispersing machine was set to 12.57 (m/s).

Wet Process Step (c): Step of Drying the Raw Materials

A solid material was separated and collected from the dispersion slurry. A wet cake obtained was molded into an elongated cylindrical pellet shape with a diameter of 5 mm. Immediately after the molding, the pellet-shaped molded body was heated and dried at 250° C. for 2 hours while being ventilated by air, and thus a black dry powder was obtained.

Wet Process Step (d): Burning Step (Burning)

50 g of the dry powder obtained was put into a round crucible (container having a diameter of 90 mm and a height of 75 mm), was set into the electric muffle furnace (KM-160 made by TOYO ENGINEERING WORKS, LTD.), was increased in temperature from room temperature to 1080° C. (burning temperature), was held at the burning temperature for 2 hours to be burned and was then naturally cooled to room temperature.

Wet Process Step (e): Pulverizing Step

On the burned material obtained, pulverization treatment was repeated twice, with a preparation volume of 20 g for each time, at the rotation speed of 16000 rpm for 30 seconds with the sample mill pulverizer (model name: SK-M10, made by Kyoritsu Riko Co., Ltd.), and thus a perovskite-type composite oxide powder was obtained.

Then, 200 g of $ZrO_2$ beads having a diameter of 1.0 mm, 117 g of pure water and 50 g of the perovskite-type composite oxide powder were put into the pot of the four-tube sand grinder (TSG-4U type, capacity: 350 ml) made by IMEX Co., Ltd. While the pot was being cooled with cooling water of 20° C., pulverization treatment was performed at the rotation speed of 1500 rpm for 50 minutes, and thus slurry containing the pulverized material of the perovskite-type composite oxide powder as a solid content was obtained. Thereafter, the slurry obtained was filtered to be separated and was dried at 125° C., and thus a perovskite-type composite oxide powder according to Example 6 was obtained.

[Table 1]

In the composite oxide powders of Examples 1 to 3 which had an LSCF composition and satisfied the specific surface area value ratio α/β and the specific surface area value α specified in the present invention, the porosities when the air electrode was used were desired porosities to be 34.0%, 40.0% and 32.0%, and conductivity values were satisfactory values to be 117 (S/cm), 105 (S/cm) and 160 (S/cm).

By contrast, in the composite oxide powder of Comparative Example 1 which had the same LSCF composition but in which the specific surface area value ratio α/β was so small as to be 0.89 (S/cm) as compared with the range specified in the present invention, the porosity when the air electrode was used was relatively high to be 42.0 but conductivity was so low as to be 21 (S/cm). On the other hand, in the composite oxide powder of Comparative Example 2 in which the specific surface area value ratio α/β was so large as to be 1.72 (S/cm) as compared with the range specified in the present invention, the porosity when the air electrode was used was so low as to be 28.3 and conductivity was so low as to be 89 (S/cm) as compared with the composite oxide powders of Examples 1 to 3.

In the composite oxide powders of Examples 4 to 6 which had an LNCF composition and satisfied the specific surface area value ratio α/β and the specific surface area value α specified in the present invention, the porosities when the air electrode was used were desired porosities to be 40.0%,

| | Precursor | | Burning Temperature | Burning and pulverization condition | | | Composition | |
| --- | --- | --- | --- | --- | --- | --- | --- | --- |
| | Process | Dispersion | (° C.) | Dry-pulverization | Wet-pulverization | Dispersion | La | Sr |
| Example 1 | Wet | Yes | 990 | Yes | No | No | 0.60 | 0.40 |
| Example 2 | Wet | Yes | 1080 | Yes | No | No | 0.60 | 0.40 |
| Example 3 | Wet | Yes | 1080 | Yes | Yes | No | 0.60 | 0.40 |
| Comparative Example 1 | Dry | No | 1080 | Yes | No | No | 0.62 | 0.40 |
| Comparative Example 2 | Dry | No | 1080 | Yes | Yes | No | 0.62 | 0.40 |
| Example 4 | Dry | No | 1250 | Yes | Yes | Yes | 1.01 | — |
| Example 5 | Dry | No | 1080 | Yes | Yes | Yes | 1.01 | — |
| Example 6 | Wet | Yes | 1080 | Yes | Yes | No | 1.01 | — |
| Comparative Example 3 | Dry | No | 1250 | Yes | No | No | 1.01 | — |
| Comparative Example 4 | Dry | No | 1080 | Yes | No | No | 1.01 | — |

| | Composition | | | $D_{50}$ | BET one-point specific surface area α | Mercury intrusion method specific surface area β | Specific surface area ratio α/β | Conductivity 700° C. | Porosity |
| --- | --- | --- | --- | --- | --- | --- | --- | --- | --- |
| | Fe | Co | Ni | (μm) | (m²/g) | (m²/g) | (-) | (S/cm) | % |
| Example 1 | 0.80 | 0.20 | — | 0.7 | 4.5 | 4.35 | 1.04 | 117 | 34.0 |
| Example 2 | 0.80 | 0.20 | — | 7.5 | 2.5 | 2.38 | 1.05 | 105 | 40.0 |
| Example 3 | 0.80 | 0.20 | — | 0.6 | 5.1 | 4.07 | 1.25 | 160 | 32.0 |
| Comparative Example 1 | 0.79 | 0.20 | — | 1.2 | 1.9 | 2.14 | 0.89 | 21 | 42.0 |
| Comparative Example 2 | 0.79 | 0.20 | — | 0.7 | 7.5 | 4.37 | 1.72 | 89 | 28.0 |
| Example 4 | — | 0.40 | 0.59 | 1.0 | 4.3 | 3.46 | 1.24 | 361 | 40.0 |
| Example 5 | — | 0.40 | 0.59 | 0.8 | 4.1 | 3.56 | 1.15 | 349 | 31.0 |
| Example 6 | — | 0.39 | 0.59 | 0.7 | 4.0 | 3.05 | 1.33 | 390 | 34.0 |
| Comparative Example 3 | — | 0.40 | 0.59 | 11.5 | 0.4 | 0.43 | 0.93 | 165 | 41.0 |
| Comparative Example 4 | — | 0.40 | 0.59 | 3.6 | 1.3 | 1.80 | 0.72 | 149 | 44.2 |

31.0% and 34.0%, and conductivity values were satisfactory to be 361 (S/cm), 349 (S/cm) and 390 (S/cm).

By contrast, in the composite oxide powders of Comparative Examples 3 and 4 which had the same LSCF composition but in which the specific surface area value ratios $\alpha/\beta$ were so small as to be 0.93 (S/cm) and 0.72 (S/cm) as compared with the range specified in the present invention, the porosities when the air electrode was used were relatively high to be 41.0% and 44.2% but conductivity values were so low as to be 165 (S/cm) and 149 (S/cm) as compared with the composite oxide powders of Examples 4 to 6.

INDUSTRIAL APPLICABILITY

When a composite oxide powder according to the present invention is used as an air electrode for a fuel cell, satisfactory conductivity is ensured.

REFERENCE SIGNS LIST 1 fuel electrode
2 solid electrolyte
3 air electrode

The invention claimed is:

1. A composite oxide powder comprising:
a composition represented by a composition formula (1) below,
wherein a ratio $\alpha/\beta$ of a specific surface area value $\alpha$ (m$^2$/g) calculated by a BET one-point method to a specific surface area value $\beta$ (m$^2$/g) calculated from a formula (2) below is greater than 1.0 and equal to or less than 1.5, and
the specific surface area value $\alpha$ is equal to or greater than 2.5 m$^2$/g and equal to or less than 20 m$^2$/g:

$$ABO_{3-\delta} \quad (1)$$

wherein in the composition formula (1), A is one or more types of elements selected from the group consisting of La, Sr, Sm, Ca and Ba, B is one or more types of elements selected from the group consisting of Fe, Co, Ni and Mn and $0 \leq \delta < 1$; and $$\text{specific surface area value } \beta \text{ (m}^2\text{/g)}=\text{specific surface area value } \gamma - \text{specific surface area value } \varepsilon \quad (2)$$

wherein in the formula (2), the specific surface area value $\gamma$ (m$^2$/g) is a cumulative value of specific surface area values in a total pore size range measured by a mercury intrusion method, and the specific surface area value $\varepsilon$ (m$^2$/g) is a cumulative value of specific surface area values in a pore size range of pore sizes that are larger than a 50% cumulative particle size (volume conversion-$D_{50}$) in a particle size distribution calculated by a Microtrac particle size distribution measuring device.

2. The composite oxide powder according to claim 1, wherein the 50% cumulative particle size (volume conversion-$D_{50}$) is in a range equal to or greater than 0.1 μm and equal to or less than 10 μm.

3. The composite oxide powder according to claim 1, wherein in the composition formula (1), A is La or La and Sr, and B is one or more types of elements selected from the group consisting of Fe, Co and Ni.

4. An air electrode for a fuel cell, the air electrode comprising:
the composite oxide powder according to claim 1.

5. A solid oxide fuel cell comprising:
a fuel electrode:
a solid electrolyte; and
the air electrode according to claim 4.

6. A composite oxide powder comprising:
a composition represented by a composition formula (1) below,
wherein a ratio $\alpha/\beta$ of a specific surface area value $\alpha$ (m$^2$/g) calculated by a BET one-point method to a specific surface area value $\beta$ (m$^2$/g) calculated from a formula (2) below is greater than 1.0 and equal to or less than 1.5,
the specific surface area value $\alpha$ is equal to or less than 20 m$^2$/g and
the specific surface area value $\beta$ is equal to or greater than 1.5 m$^2$/g:

$$ABO_{3-\delta} \quad (1)$$

wherein in the composition formula (1), A is one or more types of elements selected from the group consisting of La, Sr, Sm, Ca and Ba, B is one or more types of elements selected from the group consisting of Fe, Co, Ni and Mn and $0 \leq \delta < 1$; and $$\text{specific surface area value } \beta \text{ (m}^2\text{/g)}=\text{specific surface area value } \gamma - \text{specific surface area value } \varepsilon \quad (2)$$

wherein in the formula (2), the specific surface area value $\gamma$ (m$^2$/g) is a cumulative value of specific surface area values in a total pore size range measured by a mercury intrusion method, and the specific surface area value $\varepsilon$ (m$^2$/g) is a cumulative value of specific surface area values in a pore size range of pore sizes that are larger than a 50% cumulative particle size (volume conversion-$D_{50}$) in a particle size distribution calculated by a Microtrac particle size distribution measuring device.

7. The composite oxide powder according to claim 6, wherein the specific surface area value $\alpha$ of the powder calculated by the BET one-point method is equal to or greater than 2.5 m$^2$/g.

8. The composite oxide powder according to claim 6, wherein the 50% cumulative particle size (volume conversion-$D_{50}$) is in a range equal to or greater than 0.1 μm and equal to or less than 10 μm.

9. The composite oxide powder according to claim 6, wherein in the composition formula (1), A is La or La and Sr, and B is one or more types of elements selected from the group consisting of Fe, Co and Ni.

10. An air electrode for a fuel cell, the air electrode comprising:
the composite oxide powder according to claim 6.

11. A solid oxide fuel cell comprising:
a fuel electrode:
a solid electrolyte; and
the air electrode according to claim 10.

* * * * *